United States Patent
Richardson et al.

(10) Patent No.: US 10,852,275 B2
(45) Date of Patent: Dec. 1, 2020

(54) ION MOBILITY MASS SPECTROMETER AND METHOD OF PERFORMING ION MOBILITY MASS SPECTROMETRY

(71) Applicant: MICROMASS UK LIMITED, Wilmslow (GB)

(72) Inventors: Keith George Richardson, High Peak (GB); Martin Raymond Green, Bowdon (GB); David J. Langridge, Macclesfield (GB)

(73) Assignee: MICROMASS UK LIMITED, Wilmslow (GB)

( * ) Notice: Subject to any disclaimer, the term of this patent is extended or adjusted under 35 U.S.C. 154(b) by 0 days.

(21) Appl. No.: 16/335,128

(22) PCT Filed: Sep. 19, 2017

(86) PCT No.: PCT/GB2017/052775
§ 371 (c)(1),
(2) Date: Mar. 20, 2019

(87) PCT Pub. No.: WO2018/055347
PCT Pub. Date: Mar. 29, 2018

(65) Prior Publication Data
US 2019/0212297 A1     Jul. 11, 2019

(30) Foreign Application Priority Data
Sep. 20, 2016 (GB) .................................. 1616017.8
Sep. 27, 2016 (GB) .................................. 1616405.5

(51) Int. Cl.
    *G01N 27/62*     (2006.01)
    *H01J 49/40*     (2006.01)

(52) U.S. Cl.
    CPC ............ *G01N 27/622* (2013.01); *H01J 49/40* (2013.01)

(58) Field of Classification Search
USPC .................................................. 250/286, 287
See application file for complete search history.

(56) References Cited

U.S. PATENT DOCUMENTS

| 4,633,083 A | 12/1986 | Knorr et al. |
| 4,707,602 A | 11/1987 | Knorr |

(Continued)

FOREIGN PATENT DOCUMENTS

| GB | 2537739 A | 10/2016 |
| GB | 2537740 A | 10/2016 |

OTHER PUBLICATIONS

Search Report under Section 17(5) for United Kingdom Application No. GB1616405.5 dated Mar. 10, 2017, 5 pages.

(Continued)

*Primary Examiner* — Kiet T Nguyen

(57) ABSTRACT

A method of ion mobility spectrometry is disclosed comprising: transmitting a plurality of ions to an ion mobility separator 6; modulating the introduction of the ions into the ion mobility separator 6 at a first modulation frequency; separating the ions that enter the ion mobility separator 6 according to ion mobility; detecting ions that have exited the ion mobility separator with a detector of a time of flight mass analyser 8; varying the first modulation frequency with time; recording the intensity of the ion signal output from the detector to produce recorded data; modulating the recorded data as a function of the time that the data was recorded and at a second modulation frequency, wherein the second modulation frequency is varied as a function of the time that the data was recorded; and determining, from the variation in intensity of the ion signal in the modulated data as a function of the second modulation frequency, the ion mobilities of the ions that have been detected.

18 Claims, 5 Drawing Sheets

(56) References Cited

U.S. PATENT DOCUMENTS

| | | | |
|---|---|---|---|
| 4,855,593 | A | 8/1989 | Bodenhausen et al. |
| 6,580,068 | B1 | 6/2003 | Tarver, III et al. |
| 6,992,283 | B2 | 1/2006 | Bateman et al. |
| 7,031,877 | B2 | 4/2006 | LeGore et al. |
| 7,069,152 | B2 | 6/2006 | Skilling |
| 7,250,306 | B2 | 7/2007 | Guevremont et al. |
| 7,388,197 | B2 | 6/2008 | McLean et al. |
| 8,022,359 | B2 | 9/2011 | Michelmann |
| 8,431,886 | B2 | 4/2013 | Grothe, Jr. |
| 9,646,814 | B2 | 5/2017 | Brown et al. |
| 9,829,465 | B2 | 11/2017 | Green et al. |
| 2003/0226964 | A1* | 12/2003 | Tarver, III ............ G01N 27/622 250/287 |
| 2009/0294647 | A1 | 12/2009 | Michelmann |
| 2013/0292562 | A1 | 11/2013 | Clemmer et al. |
| 2015/0041636 | A1 | 2/2015 | Giles et al. |
| 2016/0003773 | A1 | 1/2016 | Giles et al. |
| 2016/0282305 | A1* | 9/2016 | Green ................ H01J 49/0027 |
| 2016/0284530 | A1* | 9/2016 | Green ................ H01J 49/0036 |
| 2016/0320341 | A1* | 11/2016 | Knochenmuss ..... G01N 27/622 |
| 2018/0100830 | A1* | 4/2018 | Gonin ................ H01J 49/0072 |

OTHER PUBLICATIONS

International Search Report and Written Opinion for International Application No. PCT/GB2017/052775 dated Dec. 11, 2017, 18 pages.

Clowers, B., et al., "A Two-Phase Approach to Fourier Transform Ion Mobility Time-of-Flight Mass Spectrometry", Analyst, 140(20):6862-6870, Jan. 1, 2015.

Knorr, F. J., et al., "Fourier Transform Ion Mobility Spectrometry", Analytical Chemistry, 57(2):402-406, Feb. 1985.

Knorr, "Fourier Transform Time-of-Flight Mass Spectrometry", Analytical Chemistry, 58(4):690-694, Apr. 1986.

Blom, "Utility of Peak Shape Analyses in Determining Unresolved Interferences in Exact Mass Measurements at Low Resolution", Journal of the American Society for Mass Spectrometry, vol. 9, p. 89-98, 1998.

Examination Report for GB Application No. GB1604627.8 dated Oct. 19, 2017.

Dietiker, R., et al., "Fourier Transform Ion Mobility Measurement of Chain Branching in Mass-Selected, Chemically Trapped Oligomers from Methylalumoxane-Activated, Metallocene-Catalyzed Polymerization of Ethylene", Journal of the American Chemical Society 129(10)2796-2802, Apr. 2007.

Belov, M. E., et al., "Multiplexed Ion Mobility Spectrometry-Orthogonal Time-of-Flight Mass Spectrometry", Analytical Chemistry, 79(6)2451-2462, 2007.

Clowers, B. H., et al., "Hadamard Transform Ion Mobility Spectrometry", Analytical Chemistry, American Chemical Society, 78(1):44-51, 2006.

Szumlas, A. W., et al., "Hadamard Transform Ion Mobility Spectrometry", Analytical Chemistry, 78(13):4474-4481, 2006.

Qi et al., "Phase Correction of Fourier Transform Ion Cyclotron Resonance Mass Spectra Using MatLab", J. Am. Soc. Mass Spectrom., 22(1):138-147, Jan. 2011.

Szumlas et al., "Phase-Resolved Detection in Ion-Mobility Spectrometry", Analytica Chimica, 566 pp. 45-54, 2006.

\* cited by examiner

ION MOBILITY MASS SPECTROMETER AND METHOD OF PERFORMING ION MOBILITY MASS SPECTROMETRY

CROSS-REFERENCE TO RELATED APPLICATION

This application is a national phase filing claiming the benefit of and priority to International Patent Application No. PCT/GB2017/052775, filed on Sep. 19, 2017, which claims priority from and the benefit of United Kingdom patent application No. 1616017.8 filed on Sep. 20, 2016 and United Kingdom patent application No. 1616405.5 filed on Sep. 27, 2016. The entire contents of these applications are incorporated herein by reference.

FIELD OF THE INVENTION

The present invention generally relates to ion mobility spectrometry and a spectrometer for performing such techniques. Embodiments of the invention relate to Fourier transform spectrometry and spectrometers.

BACKGROUND

Fourier transform time of flight and ion mobility spectrometers (and other velocity dispersive analysis) are well known. For example, see Knorr et al Anal. Chem. 1986. 58. 690-694 and Knorr, Hill Anal. Chem. 1985, 57, 402-406.

Fourier Transform Ion Mobility Spectrometry (FT-IMS) is a multiplexing technique in which ions are gated into and out of the ion mobility separator (IMS) cell by ion gates arranged at the ends of the IMS device. The gating signal that opens and closes the ion gates is generally identical on both ion gates and the frequency of the gating signal on each ion gate is swept with time. The ions that are transmitted through both ion gates are detected by an ion detector. The amplitude of the signal output from the detector, for an ion of specific mobility, varies as a substantially triangular wave function that has a frequency that is characteristic of the ion's ion mobility. The ion signal may be measured as a function of the ion gate signal frequency. A Fourier transform is then applied to this data obtained in the ion gate frequency domain so as to produce an ion mobility separation spectrum.

The duty cycle resulting from the gating of the ion beam at each gate is generally set to 50%, i.e. each ion gate is set to block ions for the same period of time that it is set to transmit ions. The overall duty cycle of the two ion gates is therefore about 25%. Accordingly, an advantage of FT-IMS is a much improved duty cycle compared to conventional atmospheric pressure ion mobility separation. In conventional atmospheric pressure ion mobility separation, ions are introduced into the drift region by rapidly opening and closing an ion gate once per IMS separation cycle. Typical gating times are in the order of 100 micro-seconds, whereas typical drift times through the IMS device are in the order of 100 milli-seconds, thus leading to a duty cycle in the order of 0.1%.

FT-IMS also has advantages over sub-atmospheric RF confined IMS techniques. In sub-atmospheric RF confined IMS devices ions are intermittently pulsed into the IMS device. In order to improve the duty cycle, between pulses when ions are not being admitted into the IMS device, the ions may be accumulated in an ion trapping region upstream of the IMS device. However, if the ion flux towards the IMS device is high then the charge density in the ion trapping region, or in the IMS device, may become high and the resulting space-charge effects may cause a loss of signal or distortions in the drift times of ions through the IMS device. These problems may be avoided in FT-IMS techniques because gating frequency allows the device to receive a continuous ion beam and operate with a relatively high duty cycle, without the need to store ions in an upstream ion trap.

U.S. Pat. No. 6,580,068 discloses a similar instrument to the FT-IMS instrument described above, except that rather than using a second ion gate at the exit of the IMS device, a high speed switch is used to either pass or block the signal from the ion detector, thereby modulating the detector signal prior to signal digitisation and data recordal. This instrument is advantageous in that it avoids the requirement for the second ion gate. However, modulating the detector signal electronically may cause unwanted distortion of the signal (e.g. pickup). Also, it may be difficult to synchronise the modulation of the ion gate with the modulation of the high speed switch.

U.S. Pat. No. 4,633,083 also discloses a similar instrument to the FT-IMS instrument described above, except that rather than using a second ion gate at the exit of the IMS device, data is recorded and manipulated by subtracting the ion signal for periods corresponding to gate closed periods.

It is desired to provide an improved method of ion mobility and/or mass spectrometry and an ion mobility and/or mass spectrometer.

SUMMARY

From a first aspect the present invention provides a method of ion mobility spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector of a time of flight mass analyser;

varying the first modulation frequency with time;

recording the intensity of the ion signal output from the detector to produce recorded data;

modulating the recorded data as a function of the time that the data was recorded and at a second modulation frequency, wherein the second modulation frequency is varied as a function of the time that the data was recorded; and determining, from the variation in intensity of the ion signal in the modulated data as a function of the second modulation frequency, the ion mobilities of the ions that have been detected.

As the present invention modulates the recorded data, it is able to produce data equivalent to conventional ion mobility instruments having ion gates at both ends of the ion mobility separator, but without necessarily requiring the ions themselves to be modulated downstream of the ion mobility separator. This enables the instrument to be simplified and may also reduce the likelihood of contamination of the instrument that would otherwise be caused by modulating the ions downstream of the ion mobility separator.

The use of a Time of Flight (ToF) mass analyser/spectrometer to detect the ion signal is particularly suitable the techniques disclosed herein. For example, these ToF instruments are capable of acquiring data/spectra at relatively high rates (e.g. over 10 kHz) and so are capable of profiling the modulation of the introduction of ions into the ion mobility separator at the first modulation frequency. These ToF instruments are also capable of determining the masses of the ions, which may be useful in filtering the ion mobility data or resolving ions having similar ion mobilities, as described in greater detail herein. ToF instruments are capable of acquiring data/spectra over a wide mass range with a high mass accuracy and a high sensitivity.

In contrast to ToF mass analysers, other high resolution mass spectrometers such as Fourier transform mass spectrometers typically operate at low frequencies of a few Hertz and are therefore incapable of resolving high modulation frequency detail. In contrast to ToF instruments, these instruments are relatively slow and operation of such instruments at a faster rate results in lower mass resolution and, often, loss of sensitivity caused by limitations in ion trap capacity. These mass spectrometers therefore suffer from the same limitations as the doubly modulating FT-IMS devices described in the Background section that operate at relatively low acquisition frequencies.

U.S. Pat. No. 4,633,083 discloses an FT-IMS instrument wherein the data that is recorded is manipulated by subtracting the ion signal for periods corresponding to gate closed periods. However, the instrument does not use a Time of Flight mass analyser to detect the ions and so does not provide the advantages described above.

Modulation of the recorded ion data, rather than the detector signal as in U.S. Pat. No. 6,580,068, may also help to prevent unwanted distortion of the ion signal (e.g. electrical pickup).

The embodiments of the invention also enable the second modulation (data modulation) to be adjusted or varied more easily. For example, the data modulation may be performed with a first modulation and then a second different form of modulation, and the form of these modulations that provides the more optimum ion mobility signal (for at least one compound or subset of compounds) may then be selected.

The data may be processed with a first default form of modulation (e.g. emulating the behaviour of a second ion gate). For example, the first default form of modulation may correspond in frequency to the first modulation frequency. The method may then perform the second form of modulation and compare the resulting data with the data resulting from the first form of modulation. The method may then determine which resulting data set is preferred and select that data set, e.g. based on predetermined tolerances. Such techniques enable the modulation of the recorded data to be optimised. In contrast to conventional instruments, these embodiments are able to adjust the second modulation (without re-running the experiment) so as to avoid adverse effects such as imperfect synchronisation of the first and second modulations.

The first modulation frequency and the manner in which the first modulation frequency is varied with time may correspond to the second modulation frequency and the manner in which the second modulation frequency is varied.

The step of modulating the recorded data may comprise: defining the recorded data as having been recorded over a plurality of sequential time periods; and performing said modulating of the data by either: (i) retaining the recorded data that was recorded during alternate ones of said time periods, and discarding the data that was recorded during the time periods between said alternate time periods; or (ii) retaining, without attenuation, the recorded data that was recorded during alternate ones of said time periods, and attenuating and retaining the data that was recorded during the time periods between said alternate time periods; or (iii) attenuating to a first level the recorded data that was recorded during alternate ones of said time periods and retaining the attenuated data, and attenuating to a second greater level the recorded data that was recorded during the time periods between said alternate time periods; wherein the time periods differ in duration as a function of the time that the data was recorded such that the second modulation frequency varies as a function of the time that the data was recorded.

The step of recording the intensity of the ion signal output from the detector may comprise intermittently recording the ion signal at an acquisition rate that is greater than the first modulation frequency so as to produce the recorded data; optionally wherein the acquisition rate is one of: ≥1 kHz; ≥5 kHz; ≥10 kHz; ≥15 kHz; ≥20 kHz; or ≥25 kHz.

The acquisition rate is desirably greater than the first modulation frequency throughout the period that the first modulation frequency is varied.

As described above, the use of a relatively high acquisition rate provided by the Time of Flight mass analyser enables sufficient data to be obtained to then correctly apply said modulation of the recorded data. However, the use of such high rates may cause the signal to contain fine detail resulting from the action of the first and second modulations that is not desired and that complicates the determination of the ion mobilities. In order to remove this fine detail, after the data has been modulated, the method may comprise down-sampling the data (i.e. processing the data to artificially reduce its sampling rate) or time-averaging the data.

Accordingly, the method may comprise down-sampling or time-averaging the recorded data so as to reduce its digitisation frequency between said step of modulating the recorded data and said step of determining the ion mobilities.

This removes unwanted high frequency information such as that resulting from the individual first and second modulation events, and also helps to produce a signal that is easier to process to determine the ion mobilities of the ions. For example, the down-sampling or time-averaging may produce a signal that varies in intensity as a function of acquisition time substantially as a smooth triangular wave for any given species of a single ion mobility. This data may then be processed as described herein below so as to determine the mobilities of the ions.

The down-sampling or time-averaging also reduces the amount of data that is required to be subsequently recorded.

The step of recording the intensity of the ion signal output from the detector may comprise digitising the signal at said acquisition rate.

The steps of recording the intensity of the ion signal output from the detector and modulating the recorded data may comprise digitising the signal from the detector and modulating the digitised signal. The signal may therefore be modulated by a digital processing device prior to the data being saved in persistent form. For example, the digitised signal may be recorded in volatile memory and then modulated. Alternatively, although less preferably, the data may be recorded in persistent form prior to being modulated.

From a second aspect the present invention provides a method of ion mobility spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector of a time of flight mass analyser;

varying the first modulation frequency with time;

recording the intensity of the ion signal output from the detector at an acquisition rate that is greater than the first modulation frequency; and determining, from the variation in intensity of the ion signal as a function of acquisition time, the ion mobilities of the ions that have been detected.

The acquisition rate may be one of: ≥1 kHz; ≥5 kHz; ≥10 kHz; ≥15 kHz; ≥20 kHz; or ≥25 kHz.

As the method records the intensity of the ion signal output from the detector at an acquisition rate that is greater than the first modulation frequency, high quality mobility spectra may be obtained, with no modulation of the recorded data. While the data processing burden on this instrument is relatively high, it enables a relatively precise ion mobility measurement, primarily because of the additional time dependence that is captured by the fast acquisition rate but also because of the relatively high number of ions that are detected because ions are not required to be modulated downstream of the ion mobility separator. Alternatively, lower quality data may be obtained in a shorter time and or using a scan over a narrower range of frequencies. For example, data of equivalent quality to the prior art instruments having two ion gates may be obtained, but over a shorter timescale.

In conventional Fourier Transform Ion Mobility Spectrometry (FT-IMS) instruments such as those described in the Background section, the ion signal is measured using a detector operating at a speed slower than the ion gating frequency and so the individual gate opening and closing events are not visible in the data produced.

The first modulation frequency is varied with time and so the first modulation frequency is related to the acquisition time. Accordingly, the step of determining the ion mobilities of the ions may comprise determining, from the variation in intensity of the ion signal as a function of the first modulation frequency, the ion mobilities of the ions that have been detected.

In general, according to embodiments of the methods described herein, the acquisition rate is desirably greater than the first modulation frequency throughout the period that the first modulation frequency is varied.

The transmission of the ions towards the detector may not be modulated downstream of the ion mobility separator and/or may only be modulated by said step of modulating the introduction of the ions into the ion mobility separator.

The step of modulating the introduction of the ions into the ion mobility separator may comprise repeatedly alternating between: a first mode in which the ions are transmitted into the ion mobility separator; and a second mode in which substantially all ions are prevented from being transmitted into the ion mobility separator.

The step of modulating the introduction of the ions into the ion mobility separator may comprise: a) repeatedly alternating between: a first mode in which the ions are transmitted into the ion mobility separator without being attenuated; and a second mode in which ions are attenuated and are then transmitted into the ion mobility separator; or b) repeatedly alternating between: a first mode in which the ions are attenuated to a first level and then transmitted into the ion mobility separator; and a second mode in which ions are attenuated by an amount greater than the first level and are then transmitted into the ion mobility separator.

By allowing ions to be transmitted into the ion mobility separator in both the first and second modes, the duty cycle of the instrument is increased. For example, ions may be unattenuated in the first mode and attenuated by 50% in the second mode.

The first mode may be performed for an equivalent duration as the second mode. Alternatively, the first mode may be set, or may be varied, so as to be longer than the second mode. This increases the sensitivity of the instrument as more ions are transmitted into the ion mobility separator, but this may degrade the ion mobility resolution. Alternatively, the first mode may be set, or may be varied, so as to be shorter than the second mode.

The detector described herein may analyse the ions at an acquisition rate that is greater than the first modulation frequency throughout said step of varying the first modulation frequency.

The various embodiments disclosed herein may have the following features.

The methods may further comprise determining the mass to charge ratios of the ions detected, optionally using said time of flight mass analyser; associating the ion mobility for any given ion that has been detected with the mass to charge ratio determined for that ion; and determining the presence of different types of ions in said plurality of ions by determining that the different types of ions have different combinations of ion mobility and mass to charge ratio.

The method may comprise recording the intensity of the ion signal output from the detector as a function of the acquisition time (which is related to the first or second modulation frequency) and as a function of mass to charge ratio of the ions. By recording the intensity of the ion signal output from the detector as a function of the acquisition time and as a function of mass to charge ratio of the ions, the signal intensity, ion mobility and mass to charge ratio are associated with each other for each type of ion. This enables different ions that overlap in either mass to charge ratio or ion mobility to be resolved. The resolved data can then be used to more accurately obtain the mass to charge ratios or ion mobilities of the different ions.

The methods may comprise using a mass analyser comprising said detector to determine the mass to charge ratios of the ions.

The mass analyser may be a time of flight mass analyser, e.g. such as an orthogonal acceleration time of flight mass analyser.

The ion signal output from the detector may be comprised of contributions of different ion signals from different types of ions, wherein the ion signal from each of the different types of ions varies in intensity as a function of the acquisition time or first or second modulation frequency with a pattern, phase or frequency that is characteristic of the ion mobility for that ion, and wherein said characteristic pattern, phase or frequency associated with each different type of ion may be used to determine the ion mobility of that ion.

The ion signal from each of the different types of ions may vary in intensity as a function of the acquisition time or first or second modulation frequency as a substantially triangular wave function.

The intensity of the ion signal output from the detector may be determined as a function of acquisition time or the first or second modulation frequency so as to obtain data in an acquisition time or modulation frequency domain; and the method may comprise processing said data so as to transform it from said acquisition time or modulation frequency domain into the drift time domain so as to represent the intensity of the ion signal output from the detector as a function of the drift time through the ion mobility separator;

and the ion mobilities of the ions may be determined from the drift times at which the ion signal peaks.

The methods may comprise transforming said data from said acquisition time or modulation frequency domain into the drift time domain so as to represent the intensity of the ion signal output from the detector as a function of the drift time through the ion mobility separator and as a function of mass to charge ratio.

The ion signal output from the detector may be comprised of contributions of different ion signals from different types of ions, and the ion signals contributed by the different types of ions may not overlap with each other when represented in a two dimensional space as function mass to charge ratio and drift time.

The data may be transformed from said acquisition time or modulation frequency domain into the drift time domain by Fourier transformation; or the data may be transformed from said acquisition time or modulation frequency domain into the time domain by a forward modelling deconvolution technique.

In embodiments where the data is transformed from said acquisition time or modulation frequency domain into the drift time domain by Fourier transformation, the method may comprise recording the intensity of the modulated signal as a function of the acquisition time (or first or second modulation frequency) so as to obtain data in a modulation frequency domain; performing a Fourier transformation of said data (optionally after down-sampling or time-averaging) so as to produce complex spectral data; producing absorption spectral data representative of an absorption spectrum of said complex spectral data; and determining the ion mobilities of said ions from said absorption spectral data. Said absorption spectrum may be the real part of the complex spectral data.

The use of the absorption spectrum to determine the ion mobility of the ions improves the resolution of drift time IMS data. The inventors have recognised that for FT-IMS techniques, the signals have the same starting phase and that the absorption mode spectrum can therefore be used to accurately determine the ion mobilities of the ions, without the peak shapes becoming asymmetrical after Fourier transformation. Fundamentally, it has been recognised that when the frequency of the pulsing of the ion gates approaches zero (i.e. the ion gates remain open), the amplitude of the ion signal for ions of any ion mobility approaches a maximum. It therefore follows that the phases for all signals seen in the FT-IMS spectra are substantially identical. As the relationship between ion mobility and phase is known, $F(\omega)$ can be rotated in complex space to allow calculation of a pure absorption mode spectrum directly.

In FT-IMS systems the amplitude of the detected signal is measured with respect to the frequency of the gate signal ($\Omega$). For FT-IMS techniques, wherein all signals have the same starting phase, the relationship between the gate modulation frequency domain data and the complex spectral data is described by the following equation:

$$F(\omega)=\int F(\Omega)e^{i\omega\Omega}dt=A(\omega)+iD(\omega)$$

where $\omega$ is the characteristic frequency of the amplitude of the measured signal at the exit of the IMS device and $\Omega$ is the gate signal frequency; $F(\omega)$ is the ion signal as a function of IMS drift time; $A(\omega)$ is the real part of the spectrum (absorption mode spectrum); and $D(\omega)$ is the imaginary part of the spectrum (dispersion mode spectrum).

As described above, alternatively the methods may comprise processing the data using a forward modelling deconvolution technique so as to transform the data from said acquisition time or modulation frequency domain (optionally after down-sampling or time-averaging) into data in the drift time domain so as to represent the intensity of the ion signal output from the detector as a function of the drift time of the ions through the ion mobility separator. These methods may then identify one or more peaks in the ion signal within the drift time domain data; determine a drift time at which each of said one or more peaks occurs; and use the drift time associated with each peak to determine the ion mobility of an ion.

As described above, in the acquisition time or modulation frequency domain the ion signal output from the detector may vary in intensity with acquisition time with a pattern that is characteristic of the ion's drift time through the ion mobility separator. Alternatively, a plurality of different types of ions may be transmitted to the ion mobility separator, and the ion signal output from the detector may be comprised of contributions of different ion signals from the different types of ions, wherein in the acquisition time or modulation frequency domain the ion signal from each of the different types of ions varies in intensity with acquisition time with a pattern that is characteristic of the ion's drift time through the ion mobility separator.

The ion signal from each one of different types of ions may vary in intensity as a function of the acquisition time as a substantially triangular wave function.

Optionally, the forward modelling deconvolution technique comprises defining a plurality of model signals having different combinations of phase and/or frequency and/or amplitude, superimposing the model signals and comparing the resulting composite signal to the signal output from the detector, and determining if the composite signal matches the ion signal output from the detector.

Optionally, if the composite signal does not match the ion signal output from the detector, then the amplitude and/or phase and/or frequency of one or more of the model signals is altered, the model signals are superimposed again and the resulting composite signal is compared to the signal output from the detector to determine if the composite signal matches the ion signal output from the detector.

The method may perform the steps of: (i) modifying the amplitude and/or phase and/or frequency of the model signals, (ii) superimposing the model signals, (iii) comparing the resulting composite signal to the signal output from the detector, and (iv) determining if the composite signal matches the ion signal output from the detector; wherein steps (i)-(iv) are repeatedly performed in an iterative manner until the superimposed model signals match the ion signal output from the detector (optionally to within a predetermined tolerance), or until no significant further improvement can be attained.

A maximum likelihood method, a maximum entropy method, a maximum a posteriori (MAP) method or a Bayesian method may be used in said iterative manner to determine when the superimposed model signals match the ion signal output from the detector.

In a specific example, a nested sampling technique (e.g. Skilling 2006) may be used to obtain a representative set of deconvolved signals.

Each model signal (of the superimposed model signals that match the ion signal output from the detector) optionally represents a different type of ion; wherein the phase and/or frequency and amplitude of each model signal are used to determine the ion mobility and intensity, respectively, of the ion that the model signal represents.

The model signals are optionally periodic signals.

The model signals are optionally phase shifted copies of the modulation profile of the first gate signal, optionally blurred or modified to account for diffusion.

The method optionally comprises: obtaining a relationship between the mass to charge ratios of the ions and the drift times of the ions; mass analysing the ions to determine the mass to charge ratios of the ions; using the determined mass to charge ratios and said relationship to estimate the ion mobilities of the ions; selecting only model signals having phases and/or frequencies that are representative of the estimated ion mobilities; and using only these selected model signals in said forward modelling technique. Alternatively, information regarding the likely distribution of ion mobilities may be used to define a prior probability distribution over ion mobility or the two dimensional space of mass to charge and ion mobility in a probabilistic analysis of the data.

Said step of mass analysing may comprise mass analysing the ions downstream of the ion mobility separator. Alternatively, said step of mass analysing may comprise mass analysing said ions upstream of the ion mobility separator, optionally wherein said mass analysing is performed by providing a mass filter upstream of the ion mobility separator and mass selectively transmitting ions of known mass to charge ratio to the ion mobility separator. The mass to charge ratio or range of ratios transmitted by the mass filter may be scanned or stepped with time.

The step of obtaining a relationship between the mass to charge ratios of the ions and the drift times of the ions may comprise experimentally determining said relationship by mass analysing and ion mobility analysing the ions, or looking up a predetermined relationship.

The methods may comprise determining a range of drift times or ion mobilities that are associated with one of the different types of ion, filtering the data so as to include only ion signal intensity data and mass to charge ratio data that are associated with drift times or ion mobilities in said range, and identifying the mass to charge ratio of said one of the different types of ion from the filtered data.

Data for ions other than said one of the different types of ion may be filtered out.

Said range of drift times or ion mobilities may be determined to correspond to the drift times that correspond to a peak in the intensity signal in the time domain.

Said one of the different types of ion may be associated with mass to charge ratios that overlap with the mass to charge ratios of another of said different types of ions, but the range of drift times or ion mobilities that are associated with said one of the different types of ion may not overlap with the range of drift times or ion mobilities that are associated with said another of the different types of ions.

The method may comprise determining a range of mass to charge ratios that are associated with one of the different types of ion, filtering the data so as to include only ion signal intensity data and drift time or ion mobility data that are associated with mass to charge ratios in said range of mass to charge ratios, and identifying the drift time or ion mobility of said one of the different types of ion from the filtered data.

Data for ions other than said one of the different types of ion may be filtered out.

Optionally, said range of mass to charge ratios is determined to correspond to the mass to charge ratios that correspond to a peak in the intensity signal in the time domain or the acquisition time or modulation frequency domain.

Optionally, said one of the different types of ion is associated with drift times or ion mobilities that overlap with the drift times or ion mobilities of another of said different types of ions, but the range of mass to charge ratios that are associated with said one of the different types of ion do not overlap with the range of mass to charge ratios that are associated with said another of the different types of ions.

The ions may be mass analysed at time intervals, optionally regular time intervals.

The step of determining the mass to charge ratios of the ions may comprise mass analysing said ions downstream of the ion mobility separator; or said step of determining the mass to charge ratios of the ions may comprise mass analysing said ions upstream of the ion mobility separator, optionally wherein said mass analysing is performed by providing a mass filter upstream of the ion mobility separator and mass selectively transmitting ions of known mass to charge ratio to the ion mobility separator.

The ions may be mass analysed by a Time of Flight mass analyser, and optionally by an orthogonal acceleration Time of Flight mass analyser. However, alternative ion analysers may be used. For example, the time of flight mass analyser may be replaced by an analytical mass filter that is scanned or stepped so as to transmit different mass to charge ratios at different times. For example a quadrupole mass filter may be used. The filter may be scanned or stepped and data taken periodically for each step. The periodic interval or step may be less than the mass resolution of the filter and the mass ranges transmitted by the filter in each step may overlap. For example if the quadrupole has unit mass resolution, the set mass may be stepped by 0.2 amu. This will produce 5 points across each mass to charge ratio peak. Each of these 5 points has characteristic frequencies representing the ion mobilities of the population of ions transmitted in each step. This frequency profile over the mass peak may then be converted to the drift time domain so as to give drift time and mass to charge ratio information for each species.

Other filters such as differential mobility analysers or spectrometers (DMA or DMS) may be used and scanned to produce similar dimensional data sets, which may then be transformed by the same methods.

The step of determining the mass to charge ratios of the ions may comprise mass analysing the ions upstream of the ion mobility separator. The mass analysing may be performed by providing a mass filter upstream of the ion mobility separator and mass selectively transmitting ions of known mass to charge ratio to the ion mobility separator.

The mass to charge ratio or range of ratios transmitted by the mass filter may be scanned or stepped with time.

The method may be used to separate data for, or determine the presence of, different types of ions that have mass to charge ratios that overlap and/or that have ion mobilities that overlap.

The method may comprise providing a continuous ion beam towards the ion mobility separator such that the continuous ion beam is modulated at said first modulation frequency; and/or an entrance ion gate may be provided upstream of the ion mobility separator and a time-varying voltage may be applied to said entrance ion gate so as to periodically block the transmission of ions and hence modulate the introduction of ions into the ion mobility separator at said first modulation frequency.

In embodiments having both said first and second modulation frequencies, the first and second modulation frequencies may be substantially the same at any given time. However, less preferably, the first and second frequencies may be different from each other. In either case, the first and second modulation frequencies may both be varied with time. The first and second modulation frequencies may be continuously scanned or stepped (e.g. monotonically) with time.

Optionally, ions travel from the entrance to the exit of the ion mobility separator along its longitudinal axis whilst the ions are radially confined in directions orthogonal to the axis by RF potentials.

Although an ion mobility separator device has been described as the separator for separating the ions, other types of ion separators may be used for separating the ions according to a first physicochemical property. Also, the separator may separate analyte molecules, rather than ions. For example, isocratic multiplexed liquid chromatography or gas chromatography separation may be used.

Additionally, or alternatively, rather than determining the mass to charge ratios of the ions, a second physicochemical property other than mass to charge ratio may be determined.

The present invention also provides a spectrometer arranged, configured and set up to perform any of the methods described herein.

Accordingly, the first aspect provides an ion mobility spectrometer comprising:

an ion mobility separator (6 in FIG. 1) for separating ions according to ion mobility;

an ion entrance modulator (4) for modulating the introduction of the ions into the ion
mobility separator;

a time of flight mass analyser (8) having a detector (10) for detecting ions that have exited the ion mobility separator;

a recording device (12) for recording the intensity of the ion signal output from the detector to produce recorded data; and a controller (5) configured and set up to:

control the ion entrance modulator so as to modulate the introduction of the ions into the ion mobility separator with a first modulation frequency, wherein first modulation frequency varies with time;

modulate the recorded data as a function of the time that the data was recorded and at a second modulation frequency, wherein the second modulation frequency is varied as a function of the time that the data was recorded; and determine, from the variation in intensity of the ion signal in the modulated data as a function of the second modulation frequency, the ion mobilities of the ions that have been detected.

The spectrometer according to the first aspect may be configured to perform any of the methods described herein in relation to the first aspect of the invention.

The second aspect provides an ion mobility spectrometer comprising:

an ion mobility separator for separating ions according to ion mobility;

an ion entrance modulator for modulating the introduction of the ions into the ion mobility separator at a first modulation frequency;

a time of flight mass analyser having a detector for detecting ions that have exited the ion mobility separator;

a recording device for recording the intensity of the ion signal output from the detector at an acquisition rate that is greater than the first modulation frequency; and a controller configured and set up to:

control the ion entrance modulator so as to vary the first modulation frequency with time; and determine, from the variation in intensity of the ion signal as a function of the acquisition time, the ion mobilities of the ions that have been detected.

The spectrometer according to the second aspect may be configured to perform any of the methods described herein in relation to the second aspect of the invention.

The spectrometer of the first and/or second aspect of the present invention may comprise only a single ion modulator for modulating passage of ions through the instrument. For example, the spectrometer may comprise only a single ion gate (or, more generally, only a single ion attenuation device for modulating the ions).

The spectrometer may comprise a mass analyser having said detector for determining the mass to charge ratios of the ions. The mass analyser may be a time of flight mass analyser, e.g. such as an orthogonal acceleration time of flight mass analyser.

Although the methods and spectrometers have been described herein as using a Time of Flight mass analyser to detect the ions, it is contemplated that less preferably other types of mass analysers or other types of detectors may be used.

Accordingly, from a further aspect the present invention also provides a method of ion mobility spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

varying the first modulation frequency with time;

recording the intensity of the ion signal output from the detector to produce recorded data;

modulating the recorded data as a function of the time that the data was recorded and at a second modulation frequency, wherein the second modulation frequency is varied as a function of the time that the data was recorded; and determining, from the variation in intensity of the ion signal in the modulated data as a function of the second modulation frequency, the ion mobilities of the ions that have been detected.

The present invention also provides a corresponding spectrometer.

The present invention also provides a method of ion mobility spectrometry comprising:

transmitting a plurality of ions to an ion mobility separator;

modulating the introduction of the ions into the ion mobility separator at a first modulation frequency;

separating the ions that enter the ion mobility separator according to ion mobility;

detecting ions that have exited the ion mobility separator with a detector;

varying the first modulation frequency with time;

recording the intensity of the ion signal output from the detector at an acquisition rate that is greater than the first modulation frequency; and determining, from the variation in intensity of the ion signal as a function of acquisition time, the ion mobilities of the ions that have been detected.

The present invention also provides a corresponding spectrometer.

The spectrometers disclosed herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI").

The spectrometer may comprise one or more continuous or pulsed ion sources.

The spectrometer may comprise one or more ion guides.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Embodiments of the present invention will now be described, by way of example only, and with reference to the accompanying drawings in which.

DETAILED DESCRIPTION

Figure 1:
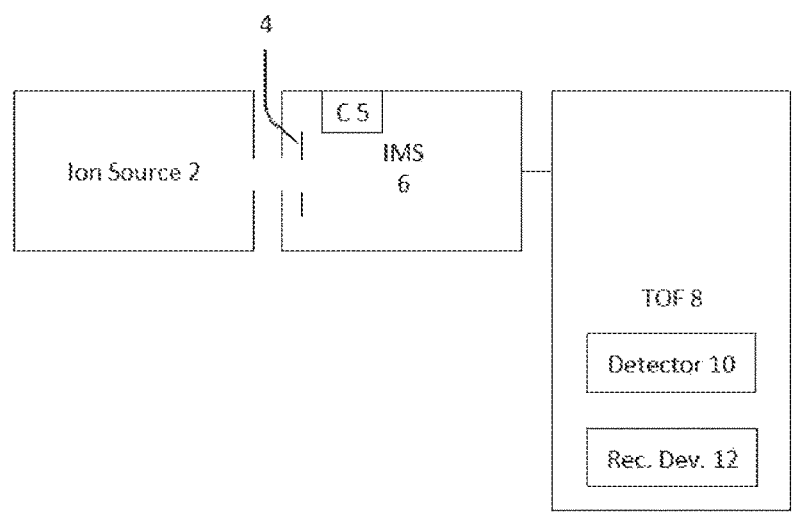
FIG. 1 shows a schematic of an FT-IMS instrument according to an embodiment of the present invention.

FIG. 1 shows a schematic of an embodiment of a FT-IMS device. The instrument comprises an ion source 2 (e.g. a continuous ion source), an entrance ion gate 4, an IMS device 6, and an ion detector system 8.

During operation the ion source 2 supplies a continuous beam of ions towards the IMS device 6. Electrical potentials are applied to the entrance ion gate 4 so as to modulate the ion beam by alternating between allowing ions to enter the IMS device 6 and blocking ions from entering the IMS device 6. Ions that are permitted to enter the IMS device 6 by the ion gate 4 are caused to separate in the IMS device 6 according to their ion mobility through a gas in the IMS device 6. The ions that exit the IMS device 6 are transmitted to the detector system 8, which detects the intensities of the ions.

In order to alternately block and transmit ions, the entrance ion gate 4 may be supplied with a time varying voltage such as an AC voltage. For example, the ion gate 4 may be supplied with a square wave voltage. When the potential created by the voltage is high, ions are blocked by the ion gate 4 and when the potential created by the voltage is low, ions are permitted to be transmitted through the ion gate 4. The voltage may be selected such that adjacent ion blocking and ion transmission periods occur for the same duration, i.e. the ion gate 4 may provide a duty cycle of 50%. The frequency with which the ion blocking periods and ion transmission periods occur (i.e. the frequency with which the ion beam is modulated) is varied with time during the experimental run. This may be achieved by scanning or stepping the frequency of the time varying voltage applied to the ion gate 4 (e.g. monotonically) with time so as to produce a modulated ion signal into the IMS device 6.

Figure 2:
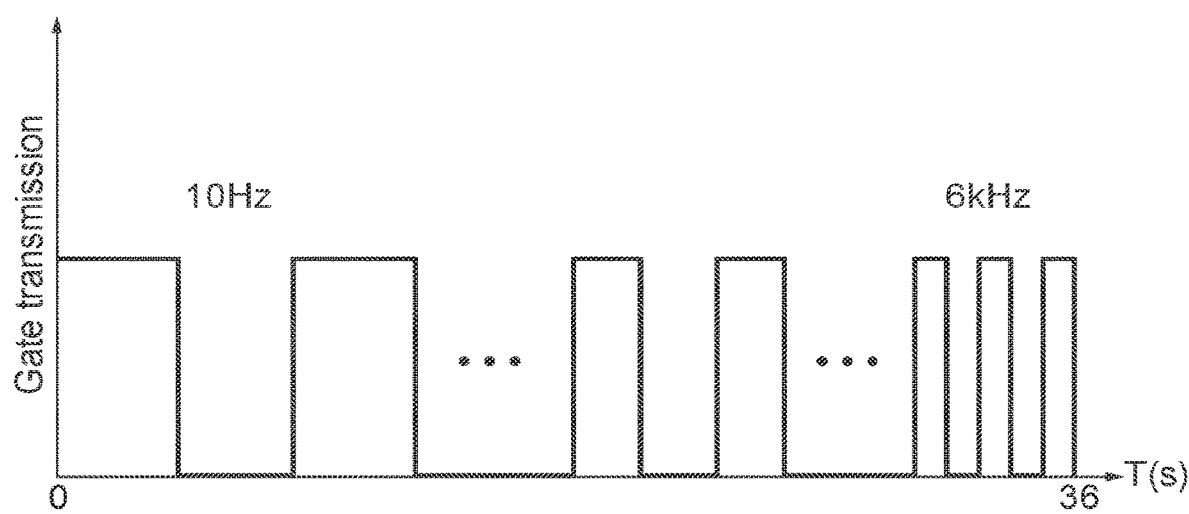
FIG. 2 shows an example transmission profile of the ion gate used in the FT-IMS instrument of FIG. 1.

FIG. 2 shows a schematic of an example of how the transmission properties of the ion gate 4 may vary with time. As shown in the example, the ion gate 4 is modulated so as to periodically allow ions to enter the IMS device 6 and periodically block ions from entering the IMS device 6. In this example, the ion gate is initially modulated between the ion transmission and blocking periods at a frequency of 10 Hz. As time progresses, the modulation frequency is progressively scanned up to 6 kHz. The transmission profiles are exaggerated so as to emphasis the change in modulation frequency and are not shown to scale. It will be appreciated that modulation frequencies other than those illustrated may be used and that the frequencies may be varied in other manners. It will also be appreciated that the ion gate 4 may provide a duty cycle other than 50% by altering the ratio of the ion transmission duration to ion blocking duration.

It is also contemplated herein that an ion attenuation device may be used rather than an ion gate, so as to alternate between transmitting ions with relatively low or no attenuation and transmitting only a portion of the ion beam with a higher level of attenuation. The attenuation may be performed by deflecting or blocking some of the ions. The use of an attenuation device rather than an ion gate allows more ions to pass into the IMS device 6 and to reach the detector 8, thus increasing the duty cycle of the instrument.

Referring back to FIG. 1, the ions transmitted through the ion gate 4 (or attenuator) and through the IMS device 6 are detected by the detection system 8. The detection system 8 detects the intensity of the ions. The detection system 8 may digitise the ion signal and record the intensity of the ion signal output from the detector at a rate that is faster than that rate at which the ions are modulated by the ion gate 4.

In some embodiments, which will be described in more detail below, the detector system 8 comprises a mass analyser that also mass analyses the ions. The mass analyser may be a discontinuous mass analyser (e.g. an orthogonal acceleration time of flight mass analyser) that analyses ions in multiple acquisitions during a single experimental run. The ions may be mass analysed at regular intervals. The mass analyser may be operated at an acquisition rate that is faster than the highest modulation frequency of the ion gate 4, i.e. sufficiently fast for the mass analyser 8 to profile the modulation of the ion signal transmitted by the ion gate 4. For instance, in the above example where the ion gate 4 modulation frequency is scanned between 10 Hz and 6 kHz, the mass analyser 8 may periodically analyse ions at an acquisition rate that is higher than 6 kHz. For example, the mass analyser 8 may periodically analyse ions at an acquisition rate of 25 kHz.

The data recorded by the detection system 8 may then be filtered by modulating the recorded data as a function of the time of its recordal. More specifically, the recorded data may be associated with its time of recordal and a modulation applied to the recorded data as a function of its time of recordal so as to modulate between retaining the recorded data and intermittently discarding recorded data. This modulation may be performed by defining the recorded data as having been recorded over a plurality of sequential time periods, and then performing the modulating of the data by retaining the recorded data that was recorded during alternate ones of said time periods and discarding the data that was recorded during the time periods between these alternate time periods. For example, the recorded data may be processed by modulating the data such that data that was recorded over a first of the time periods is retained, data that was acquired over a second time period is discarded, data that was recorded over a third time period is retained, data that was acquired over a fourth time period is discarded, and so on. This alternating pattern of data modulation may continue for all of the data recorded over the total duration of the experimental run, or over only part of the experimental run. The various time periods may be temporally immediately adjacent to each other.

It will be appreciated that the durations of the time periods that are defined in the modulation method define the frequency with which the recorded data is modulated. For example, data is modulated at a relatively high frequency for time periods that are defined as being relatively short, whereas data is modulated at a relatively low frequency for time periods that are defined as being relatively long. In these embodiments, when defining the time periods, the durations of the time periods are selected such that the data is modulated with a frequency that varies as a function of the time that the data was recorded. The data modulation frequency may be scanned or stepped (e.g. monotonically) as a function of the time of recordal of the data. The data modulation frequency and variation thereof may be set to correspond to that of the modulation frequency of the ion gate 4.

During modulation of the recorded data, the retained data may be extracted from the recorded data for further processing, without deleting the discarded data (which is not extracted for said further processing). Alternatively, during modulation of the recorded data, the discarded data may be simply deleted or zeroed, whereas the retained data is not deleted or zeroed.

Figure 3:
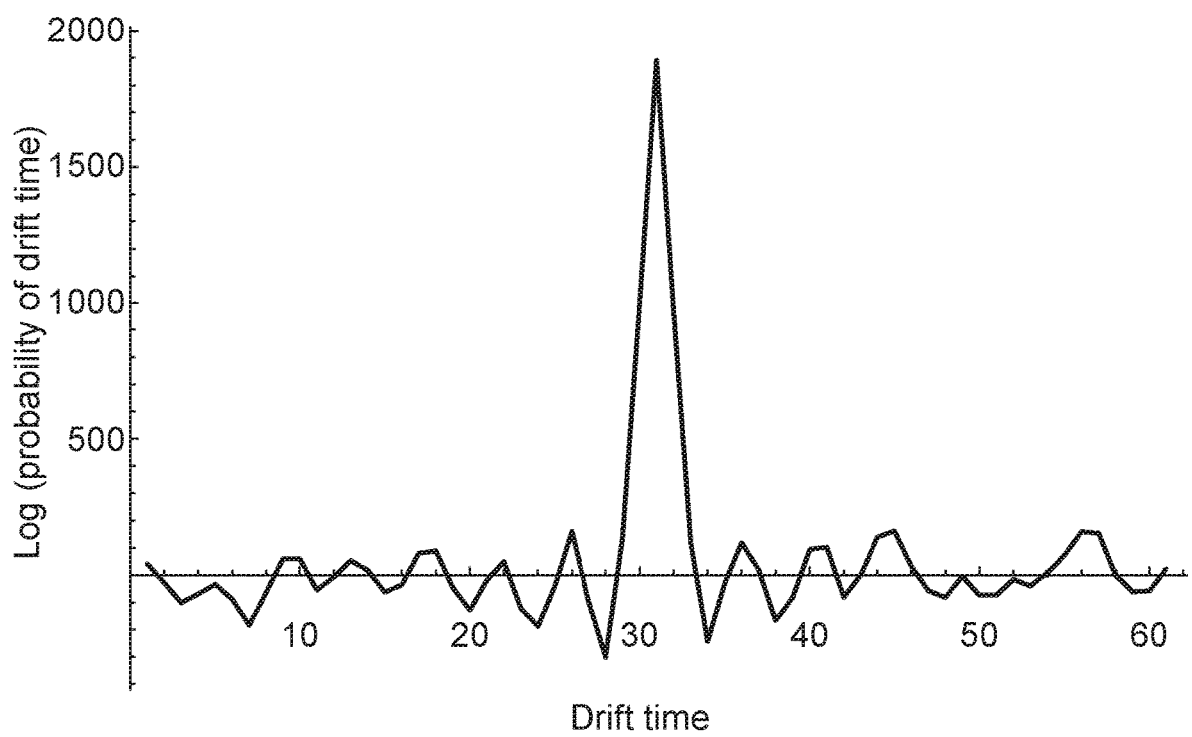
FIG. 3 shows an example drift time profile for an ion obtained by the instrument of FIG. 1 in an embodiment wherein the recorded data is modulated.

FIG. 3 shows an example of a reconstruction of the drift time of a single (arbitrary) ion species simulated for the ion introduction into the ion mobility separator 6 being modulated and the recorded data also being modulated. The simulated data was subject to Poisson ion arrival statistics, background counts and ignored diffusion. The simulation is based on the ion gate 4 transmission properties shown in FIG. 2 and a detector operating at an acquisition rate of 25 kHz. The simulation is based on an initial ion arrival rate of 100 ions per second. The uncertainty in the measured drift time is about 0.024 time bins. The vertical axis represents the logarithm of the probability (not normalised) that an ion is present at a given drift time.

Although the step of modulating has been described as retaining the recorded data that was recorded during alternate time periods, and discarding the data that was recorded during the time periods between said alternate time periods, further techniques are contemplated herein. For example, the step of modulating the data may comprise retaining (e.g. without attenuation) the recorded data that was recorded during alternate time periods, and attenuating and retaining the data that was recorded during the time periods between said alternate time periods. Alternatively, the step of modulating the data may comprise attenuating to a first level the recorded data that was recorded during alternate time periods and retaining the attenuated data, and attenuating to a second greater level the recorded data that was recorded during the time periods between said alternate time periods.

According to the various techniques disclosed herein, the retained data is then used to identify the ion mobilities of the ions. However, as the data has been recorded at a high digitisation rate, the retained data contains high frequency information caused by individual gate opening and closing events and also by the subsequent data modulation. This information may complicate the identification of the ion mobilities and so may be discarded after the data has been modulated by degrading (for example smoothing, time-averaging or down-sampling) the data to obtain degraded data in the modulation frequency domain. Such degraded data may be similar in nature to that which would have been obtained by the conventional technique of using two ion gates and a slower detector.

The amplitude of the ion signal in the retained and degraded data, for an ion of any given ion mobility, may vary as a function of the data modulation frequency as a substantially triangular wave function. The frequency of the triangular wave function may be characteristic of the ion mobility of the ion. This data, representing the ion signal amplitude obtained in the data modulation frequency domain, may therefore be transformed to the time domain (e.g. using a Fourier transform technique) so as to produce an ion mobility separation spectrum that represents the ion signal amplitude as a function of IMS drift time.

Although embodiments have been described above in which the recorded data is modulated, it is contemplated that the recorded ion signal may be processed without modulating the recorded data, e.g. in order to obtain higher quality ion mobility spectra. According to these embodiments, the intensity of the ion signal output from the detector may be recorded at an acquisition rate that is greater than the modulation frequency of the ion gate 4 (or other ion attenuation device). The ion mobilities of the ions are determined from the variation in intensity of the ion signal as a function of acquisition time (which may be related to the ion gate modulation frequency), rather than as a function of the modulation frequency of the recorded data. More specifically, the amplitude of the ion signal in the (unmodulated) recorded data, for an ion of any given ion mobility, varies as a function of the acquisition time (or ion gate modulation frequency) as a series of square pulses that are blurred by diffusion effects. The phase of the observed pulses is characteristic of the ion mobility of the ion, as it is essentially a blurred version of the modulation signal applied to the first ion gate 4 shifted by the drift time of the ion in question. This data, representing the ion signal amplitude obtained in the ion gate modulation frequency domain, may therefore be transformed to the time domain (e.g. using an iterative forward fitting technique) so as to produce an ion mobility separation spectrum that represents the ion signal amplitude as a function of IMS drift time.

It will be appreciated that not modulating the recorded data in this manner increases the data processing burden on the instrument. However, this method enhances the precision of ion mobility measurement over known systems employing both entrance and exit ion gates on either side of the IMS device, both due to the additional time dependence that is captured by the fast acquisition detector system and the increase in the number of ions detected due to the use of only a single ion gate 4 (or other attenuation device). In addition, the number of informative mass spectra that are captured by the instrument is increased by using only a single ion gate 4, thus providing higher quality mass spectral data. Alternatively, this technique may be used to shorten the acquisition time required to produce data of a given quality and/or reduce the range of modulation frequencies that is applied to the first ion gate.

The embodiments of the present invention are able to use a single ion gate 4 to provide ion mobility analysis. It will therefore be appreciated that the embodiments provide a more simple instrument than prior art instruments having both an entrance ion gate and an exit ion gate (e.g. Knorr et al). The embodiments of the present invention are able to have relatively few physical components and simplified control requirements. Furthermore, the use of only a single ion gate increases the duty cycle of the instrument. Also, devices such as ion gates that are designed to deflect or capture ions are liable to be contaminated over time and so the use of fewer such devices reduces the requirement for cleaning the instrument. Furthermore, by modulating the recorded data, embodiments are able to provide data that is equivalent to conventional instruments that use ion gates on either side of the ion mobility separator.

As described above, the detection system 8 according to the various embodiments of the present invention may comprise a mass analyser (e.g. an orthogonal acceleration time of flight mass analyser) that determines the masses of the ions detected as well as their intensities. In the recorded data, these mass values may be associated with their respective ion intensity signals. As such, when the data is transferred from the frequency domain to the time domain, a data set may be obtained that is indicative of both the mass and ion mobility of the ions. This may be used to resolve ions having similar ion mobilities, but different masses.

Embodiments wherein ions may be resolved according to mass and ion mobility will now be described. The following embodiments apply to the methods described herein wherein the recorded data is modulated.

Figure 4A:
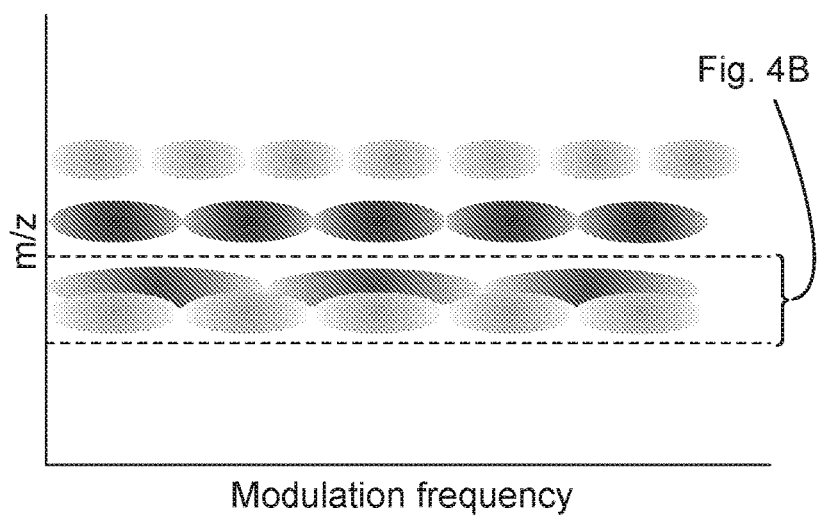
FIG. 4A shows the ion signal intensity measured by the instrument of FIG. 1, after data modulation, as a function of both modulation frequency and mass to charge ratio.

FIG. 4A shows an intensity contour plot for the ion signal detected at the mass analyser 8 as a function of both mass to charge ratio of the detected ions and the modulation frequency (i.e. the ion gate modulation frequency or the data modulation frequency). As can be seen from FIG. 4A, the intensity plot is divided into four rows that are arranged at different mass to charge ratio values. This indicates the presence of four types of ion of different mass to charge ratios, wherein each type of ion is represented by one of the rows. The darker the plot is within any given row, the more intense the ion signal detected. In this embodiment, each of the types of ions has a different ion mobility. As described above, for an ion of a given ion mobility, the amplitude of the ion signal varies as a substantially triangular wave function having a frequency that is characteristic of the ion mobility of the ion. Accordingly, the intensity plot in each row in FIG. 4A varies as a series of substantially triangular profiles as a function of the modulation frequency. The frequency of the triangular wave is different for each row of intensity plots in FIG. 4A, thus indicating that the four types of ions represented by the four rows have different ion mobilities.

Figure 4B:
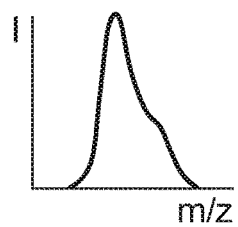
FIG. 4B shows the ion signal intensity as a function of mass to charge ratio for two ions having overlapping mass to charge ratios in the data of FIG. 4A.

The mass to charge ratios for the two types of ions represented by the two lowermost rows in FIG. 4A overlap. FIG. 4B shows a plot of the intensity of the ion signal for these two types of ions as a function of mass to charge ratio. These two types of ions may be, for example, the same species of ions but having different charge states. It will be appreciated from FIG. 4B that the two types of ions cannot be resolved from the intensity and mass to charge ratio data alone. However, the plot of FIG. 4A shows that ion signal intensities for these two types of ions vary periodically with different frequencies, as a function of the modulation frequency. These two types of ions therefore have different ion mobilities, which may be used to resolve the two types of ions.

As described above, for any given ion, the frequency with which the ion signal varies as a function of modulation frequency is characteristic of the ion mobility of the ion. The ion signal in the modulation frequency domain may be transformed to the drift time domain in order to represent the drift time (i.e. ion mobilities) of the ions through the IMS device 6. This transformation may be performed by a Fourier transformation or by other suitable processing techniques.

Figure 5A:
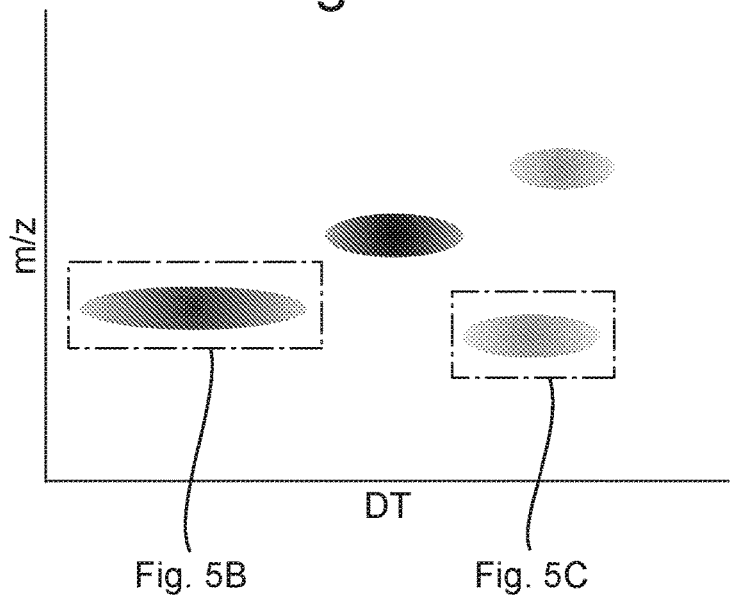
FIG. 5A shows data of FIG. 4A after conversion from the modulation frequency domain to the IMS drift time domain.

FIG. 5A shows the data of FIG. 4A after being Fourier transformed from the frequency domain to the IMS drift time domain. Therefore, FIG. 5A shows plots of the ion signal intensities as a function of mass to charge ratio and drift time through the IMS device 6. FIG. 5A shows four intensity plots arranged at different mass to charge ratio values, indicating the presence of four types, as in FIG. 4A. The darker the shading is within any one of the four plots, the more intense the ion signal detected. In contrast to the data of FIG. 4A, it can be seen that the four plots are well separated by either drift time or mass to charge ratio. It is therefore possible to resolve the four types of ions more accurately.

For example, a mass peak may be more accurately determined for any given type of ion by determining the range of drift times (i.e. ion mobilities) that are associated with a type of ion, and then filtering the data so as to only include ion signal intensity data and mass to charge ratio data that are associated with drift times in said range. This excludes ion data for ions having similar or overlapping mass to charge ratios but dissimilar IMS drift times.

Figure 5B:
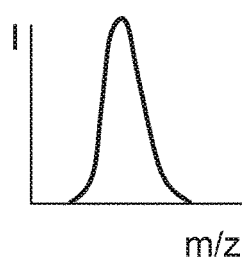
FIGS. 5B and 5C shows the ion signal intensities as a function of mass to charge ratio for two ions species in the data of FIG. 5A that correspond to the two ions having overlapping mass to charge ratios in the data of FIG. 4A.

FIG. 5B shows a plot of ion signal intensity as a function of mass to charge ratio for the type of ion represented by the second lowest row in FIGS. 4A and 5A. In order to obtain the plot of FIG. 5B, the data represented by FIGS. 4A and 5A has been filtered so as to only include ion signal and mass to charge ratio data that are associated with drift times corresponding to the drift times of the type of ion represented by the second lowest row in FIG. 5A.

Figure 5C:
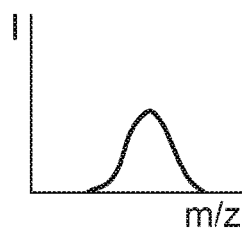

Similarly, FIG. 5C shows a plot of ion signal intensity as a function of mass to charge ratio for the type of ion represented by the lowest row in FIGS. 4A and 5A. In order to obtain the plot of FIG. 5C, the data represented by FIGS. 4A and 5A has been filtered so as to only include ion signal and mass to charge ratio data that are associated with drift times corresponding to the drift times of the type of ion represented by the lowest row in FIG. 5A.

It will be appreciated by comparing FIGS. 5B and 5C to FIG. 4B that the above described technique enables two types of ions of overlapping mass to charge ratios to be resolved. The mass to charge ratio for these two types of ions can therefore be determined more accurately from the resolved peaks.

In the method described above, the drift time has been used to resolve ions having overlapping mass to charge ratios. However, it is also contemplated that the drift time of different ions may overlap and that the mass to charge ratios of these ions may be used to resolve the two types of ions. For example, in FIG. 4A different rows of the intensity plots may have the same intensity pattern as a function of modulation frequency, thus indicating overlapping ion mobilities (i.e. drift times), but these rows may be at substantially different, non-overlapping mass to charge ratios. An ion mobility peak may be more accurately determined for any given type of ion by determining the range of mass to charge ratios that are associated with a type of ion, and then filtering the data so as to only include ion signal intensity data and drift time data that are associated with mass to charge ratios in said range. This excludes ion data for ions having similar or overlapping drift time but dissimilar mass to charge ratios.

The following embodiments apply to the methods described herein wherein the recorded data is not modulated and only the ions transmitted into the IMS device is modulated.

Figure 6A:
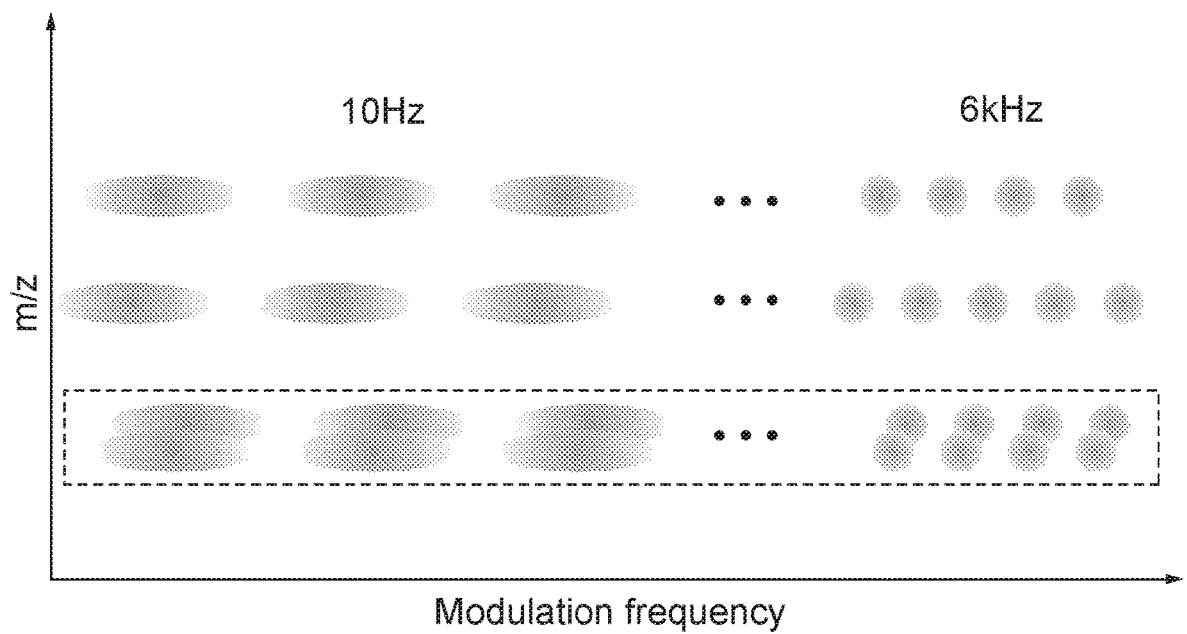
FIG. 6A depicts an intensity contour plot for the ion signal detected at the mass analyser.

FIG. 6A shows an intensity contour plot for the ion signal detected at the mass analyser 8 as a function of both mass to charge ratio of the detected ions and a small portion of the modulation frequency range (i.e. the ion gate modulation frequency). As can be seen from FIG. 6A, the intensity plot is divided into four rows that are arranged at different mass to charge ratio values. This indicates the presence of four types of ion of different mass to charge ratios, wherein each type of ion is represented by one of the rows. The darker the plot is within any given row, the more intense the ion signal detected. In this embodiment, each of the types of ions has a different ion mobility. As described above, for an ion of a given ion mobility, the amplitude of the ion signal varies as a blurred square wave having a time offset or phase that is characteristic of the ion mobility of the ion. Accordingly, the intensity plot in each row in FIG. 6A varies as a blurred square wave as a function of the modulation frequency. The time offset or phase of the blurred square wave is different for each row of intensity plots in FIG. 6A, thus indicating that the four types of ions represented by the four rows have different ion mobilities.

Figure 6B:
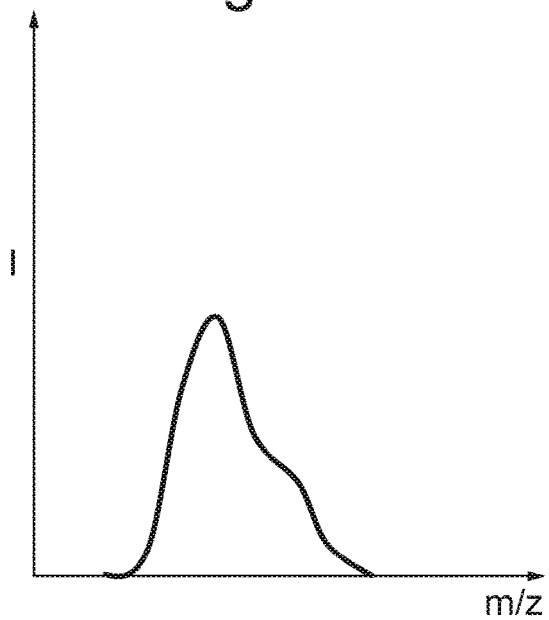
FIG. 6B depicts a plot of the intensity of the ion signal for these two types of ions as a function of mass to charge ratio.

The mass to charge ratios for the two types of ions represented by the two lowermost rows in FIG. 6A overlap. FIG. 6B shows a plot of the intensity of the ion signal for these two types of ions as a function of mass to charge ratio. These two types of ions may be, for example, the same species of ions but having different charge states. It will be appreciated from FIG. 6B that the two types of ions cannot be resolved from the intensity and mass to charge ratio data alone. However, the plot of FIG. 6A shows that ion signal intensities for these two types of ions have different time offsets or phases, as a function of the modulation frequency. These two types of ions therefore have different ion mobilities, which may be used to resolve the two types of ions.

As described above, for any given ion, the time offset or phase of the ion signal considered as a function of modulation frequency is characteristic of the ion mobility of the ion. The ion signal in the modulation frequency domain may be transformed to the drift time domain in order to represent the drift time (i.e. ion mobilities) of the ions through the IMS device 6. This transformation may be performed least squares fitting, iterated forward modelling, nested sampling or by other suitable processing techniques.

Figure 7:
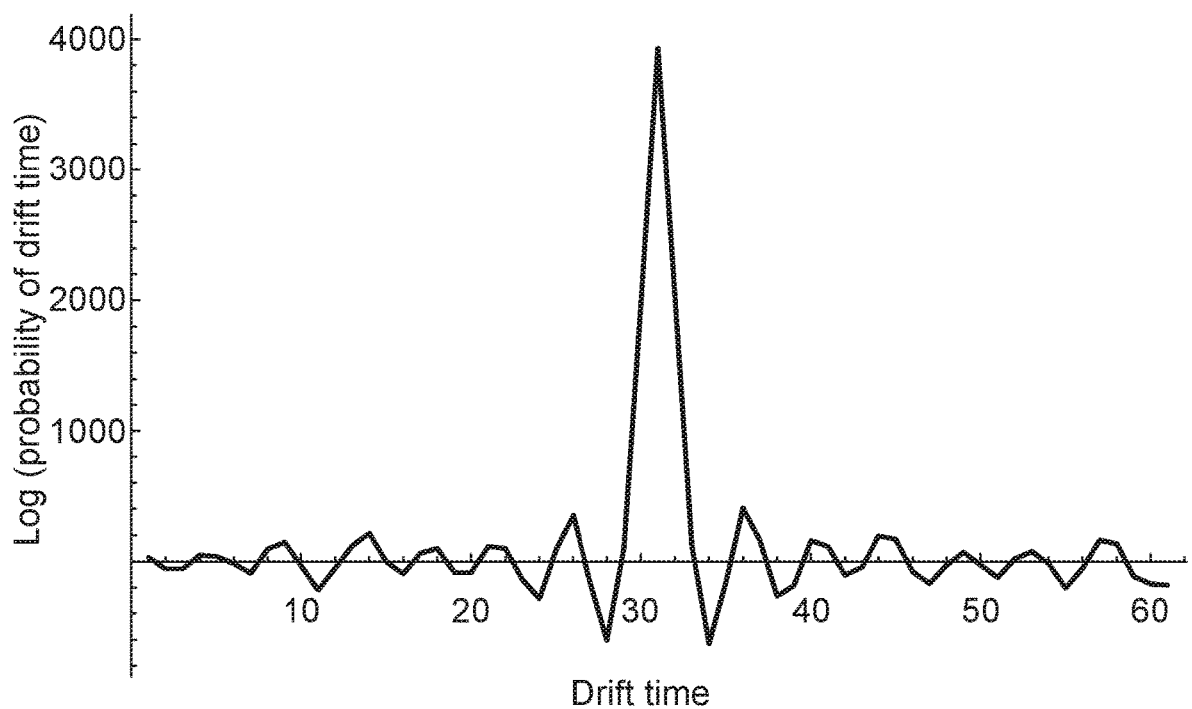
FIG. 7 shows an example drift time profile for an ion obtained by the instrument of FIG. 1 in an embodiment wherein the recorded data is not modulated.

FIG. 7 shows an example of a reconstruction of the drift time of a single (arbitrary) ion species using simulated data subject to Poisson ion arrival statistics, background counts and ignoring diffusion. The simulation is based on the ion gate transmission properties shown in FIG. 2 and a detector operating at an acquisition rate of 25 kHz. The simulation is based on an initial ion arrival rate of 100 ions per second. The uncertainty in the measured data is about 0.016 time bins. The vertical axis represents the logarithm of the probability (not normalised) that an ion is present at a given drift time calculated using a forward fitting algorithm.

FIG. 5A could equally represent the data of FIG. 6A after being transformed from the frequency domain to the IMS drift time domain and as above the four plots are well separated by either drift time or mass to charge ratio. It is therefore possible to resolve the four types of ions more accurately.

As above, a mass peak may be more accurately determined for any given type of ion by determining the range of drift times (i.e. ion mobilities) that are associated with a type of ion, and then filtering the data so as to only include ion signal intensity data and mass to charge ratio data that are associated with drift times in said range. This excludes ion data for ions having similar or overlapping mass to charge ratios but dissimilar IMS drift times.

FIG. 5B may represent a plot of ion signal intensity as a function of mass to charge ratio for the type of ion represented by the second lowest row in FIG. 6A. In order to obtain the plot similar of FIG. 5B, the data represented by FIG. 6A could be filtered to only include ion signal and mass to charge ratio data that are associated with drift times corresponding to the drift times of the type of ion represented by the second lowest row in FIG. 6A.

Similarly, FIG. 5C may represent a plot of ion signal intensity as a function of mass to charge ratio for the type of ion represented by the lowest row in FIG. 6A. In order to obtain the plot of FIG. 5C, the data represented by FIG. 6A could be filtered so as to only include ion signal and mass to charge ratio data that are associated with drift times corresponding to the drift times of the type of ion represented by the lowest row in FIG. 6A.

It will be appreciated by comparing FIGS. 5B and 5C to FIG. 6B that the above described technique enables two types of ions of overlapping mass to charge ratios to be resolved. The mass to charge ratio for these two types of ions can therefore be determined more accurately from the resolved peaks.

In the method described above, the drift time has been used to resolve ions having overlapping mass to charge ratios. However, it is also contemplated that the drift time of different ions may overlap and that the mass to charge ratios of these ions may be used to resolve the two types of ions. For example, in FIG. 6A different rows of the intensity plots may have the same intensity pattern as a function of modulation frequency, thus indicating overlapping ion mobilities (i.e. drift times), but these rows may be at substantially different, non-overlapping mass to charge ratios. An ion mobility peak may be more accurately determined for any given type of ion by determining the range of mass to charge ratios that are associated with a type of ion, and then filtering the data so as to only include ion signal intensity data and drift time data that are associated with mass to charge ratios in said range. This excludes ion data for ions having similar or overlapping drift time but dissimilar mass to charge ratios. Although the present invention has been described with reference to various embodiments, it will be understood by those skilled in the art that various changes in form and detail may be made without departing from the scope of the invention as set forth in the accompanying claims.

For example, although embodiments have been described wherein the recorded data is modulated, or the data is not modulated, it is contemplated that both techniques may be performed in a dual mode instrument. For example, in one mode the recorded data may be modulated so as to obtain a fast reconstruction of the mobility spectrum. In another mode the unmodulated full data set may be analysed to obtain more accurate drift time measurements or improved mobility resolution.

Although three dimensional data sets have been described herein, higher dimensional datasets may be produced by combining several such techniques.

As described above, the modulation frequency of the ion gate 4 may be the same, and varied in the same manner with time, as the data modulation frequency. However, it should be noted that different frequencies could be applied to the ion gate 4 and data modulation, although this is less preferable as it would require more complex processing to determine ion mobility.

A time of flight mass analyser has been described as obtaining the ion signal and mass to charge ratio data. However, other ion analysers may be used. The time of flight mass analyser may be replaced by an analytical mass filter that is scanned or stepped so as to transmit different mass to charge ratios at different times. For example a quadrupole mass filter may be used. The filter may be scanned or stepped and Fourier transform data taken for periodically or for each step. In this case the periodic interval or step is less than the mass resolution of the filter and the mass ranges transmitted by the filter in each step overlap. For example if the quadrupole has unit mass resolution, the set mass may be stepped by 0.2 amu. This will produce 5 points across each mass to charge ratio peak. Each of these 5 points has characteristic frequencies representing the ion mobilities of the population of ions transmitted in each step. This frequency profile over the mass peak may then be de-convolved to give drift time and mass to charge ratio information for each species.

Other filters such as differential mobility analysers or spectrometers (DMA or DMS) may be used and scanned to produce similar three dimensional data sets, which may then be transformed by the same methods.

There are many ways to process the three dimensional data set described herein. For example data corresponding to each mass to charge ratio point or step may be processed separately and displayed as mass to charge ratio verses frequency array for further processing. These frequency values may then converted to IMS drift times or collision cross-sections using prior calibration information for each point or step.

A series of overlapping moving average mass to charge ratio windows may be processed to produce a smoother result and to improve statistics in the final transformed data.

A Fourier transform may be used to identify the drift time of the ions, as described above.

It is however advantageous to use a two-dimensional processing algorithm to determine the likely frequency (the frequency of the ion signal in the intensity-gate voltage domain, i.e. the likely drift time) in each region of the m/z, time, intensity data.

Optionally, a known correlation between mass to charge ratio, charge state and mobility may be used to estimate or restrict the likely frequency range or ranges expected. This can speed up data processing and reduce artefacts and or mis-assignment.

Treating transformation of the data using a two dimensional fitting algorithm improves the statistical error associated with individual m/z samples which in turn improves the precision of both the m/z and drift time values calculated.

Approaches other that Fourier Transform may be taken to calculate the drift time from the characteristic variation of the of the ion signal amplitude recorded downstream of the IMS device 3.

Following data modulation, the ion signal output by the modulated-IMS instrument may be closer to a triangular wave than a pure sine wave and may be truncated. As such, deconvolution by Fourier transform may give results which have artefacts and side lobes on the peaks. These artefacts may give rise to mis-assignment of ion mobility and may require further processing such as apodisation. Also, for embodiments in which the data are not modulated, and in which only the ions entering the IMS device are modulated, Fourier transformation is not an appropriate data processing method. Accordingly, techniques other than Fourier transform may be used to transform the data in the frequency domain to data in the drift time domain. Such alternative techniques may include the use of forward modelling algorithms such as a maximum likelihood (least squares) method, a maximum entropy method, a Bayesian (probabilistic) method, or Filter diagonalisation.

In forward modelling methods, it is desired to determine a set of model modulated signals that when superimposed match the experimentally observed modulated signals. In embodiments in which the data are modulated, the model may use triangular waves rather than pure sine waves and so may be more accurate than Fourier transform techniques. In embodiments in which the data are not modulated, the model may use blurred square waves of varying frequency, where the degree of blurring for a species of a given drift time can be predicted based on diffusion or previous calibration or characterisation of the device for pure or standard compounds. In either case. the method iterates different combinations of modelled waves having differing frequencies or hypothesised drift times (i.e. time offsets or phases) and amplitudes until the best match for the experimentally obtained signal is determined. The model waves making up the best match are then used to determine the ion mobilities and intensities of the ions. More specifically, the frequency or hypothesized drift time and amplitude of each of the model waves in the best fit model represents the drift time (i.e. ion mobility) and intensity, respectively, of an experimentally observed ion.

The coupling of the modulated-IMS device with mass spectrometry facilitates application of these forward fitting techniques with practical timescales. For example, a correlation between mass to charge ratios of the ions and the drift times may be known or determined and used to simplify the modelling process. In particular, the mass to charge ratios of the ions may be determined and the correlation may then be used to determine the drift times of the ions that would be expected. The forward modelling need then only model waves having hypothesized frequencies that correspond to the expected drift times of the ions. Model waves of other hypothesized drift times or frequencies need not be considered as they would correspond to drift times of ions that are not present. This process significantly simplifies the modelling. The mass to charge ratios may be determined by mass analysing the ions downstream of the IMS device and/or by providing a mass filter upstream of the IMS device that mass selectively transmits only certain ranges of mass to charge ratios.

Forward fitting of model data may be applied to each narrow mass to charge ratio region in which far fewer species exist and therefore the signal is greatly simplified resulting in more precise results in far shorter timescales.

The form or shape of the model data to use during forward fitting may be obtained from calibration standards or sufficiently pure species within the analyte. This is advantageous as it is more accurate to determine the form or shape of model data using a real reference sample rather than use a theoretical model. For example, in the case where a signal is being fitted to intensity-modulation frequency data, theoretical model signals having a sine wave form could be used. However it would be more accurate to experimentally determine how the intensity of a reference compound (i.e. a calibration standard or sufficiently pure species) varies in the modulation frequency domain and then use model signals having the same form. For example, the intensity of the reference compound may vary as a function of modulation frequency as a triangular wave. Model signals of triangular waveform would then be used so as to fit the data more accurately.

This technique can be extended to measure a 3D surface for a reference compound so as to construct a model for forward fitting in the m/z-modulation frequency-intensity data. The model may include information about the known mass to charge ratio resolution or peak shape in the mass dimension, the sampling frequency of the mass spectrometer, or a known correlation between m/z, charge state and ion mobility to estimate a likely drift time or frequency range or ranges within each m/z region. This further simplifies and speeds up the fitting of model data.

The forward fitting approach described above may potentially yield superior IMS resolution and better signal to noise than Fourier transform techniques for this type of non-ideal data.

It is contemplated that more than one method of data post-processing may be used. For example in one mode, the above described Fourier transform technique may be used, e.g. during acquisition so as to obtain a fast reconstruction of the mobility spectrum for use in real time decision making or real time data review. The full data set may be analysed in more detail post acquisition (e.g. using forward fitting) to obtain more accurate drift time measurements or improved mobility resolution.

It is contemplated herein that the signal may be split after recordal or digitization. One copy may be histogrammed to produce standard TOF data. Another copy may be modulated and time averaged to emulate the data that would be acquired by modulating the ions with a second ion gate. This has the advantage that it is not necessary to store every acquired TOF spectrum but, for example, TOF data at 50% duty cycle and IMS information at 25% duty cycle may be obtained.

Although an IMS device has been described as the separator for separating ions, other separators may be used. For example, isocratic multiplexed LC or GC separation may be used.

The invention claimed is:

1. A method of ion mobility spectrometry comprising:
transmitting a plurality of ions to an ion mobility separator;
modulating the introduction of the ions into the ion mobility separator at a first modulation frequency;
separating the ions that enter the ion mobility separator according to ion mobility;
detecting ions that have exited the ion mobility separator with a detector of a time of flight mass analyser;
varying the first modulation frequency with time;
recording the intensity of the ion signal output from the detector to produce recorded data;
modulating the recorded data as a function of the time that the data was recorded and at a second modulation frequency, wherein the second modulation frequency is varied as a function of the time that the data was recorded; and
determining, from the variation in intensity of the ion signal in the modulated data as a function of the second modulation frequency, the ion mobilities of the ions that have been detected;

wherein said step of modulating the recorded data comprises:
defining the recorded data as having been recorded over a plurality of sequential time periods; and
performing said modulating of the data by either:
(i) retaining the recorded data that was recorded during alternate ones of said time periods, and discarding the data that was recorded during the time periods between said alternate time periods; or
(ii) retaining, without attenuation, the recorded data that was recorded during alternate ones of said time periods, and attenuating and retaining the data that was recorded during the time periods between said alternate time periods; or
(iii) attenuating to a first level the recorded data that was recorded during alternate ones of said time periods and retaining the attenuated data, and attenuating to a second greater level the recorded data that was recorded during the time periods between said alternate time periods;
wherein the time periods differ in duration as a function of the time that the data was recorded such that the second modulation frequency varies as a function of the time that the data was recorded.

2. The method of claim 1, wherein the first modulation frequency and the manner in which the first modulation frequency is varied with time corresponds to the second modulation frequency and the manner in which the second modulation frequency is varied.

3. The method of claim 1, wherein the step of recording the intensity of the ion signal output from the detector comprises intermittently recording the ion signal at an acquisition rate that is greater than the first modulation frequency so as to produce the recorded data.

4. The method of claim 3, wherein the acquisition rate is one of: ≥1 kHz; ≥5 kHz; ≥10 kHz; ≥15 kHz; ≥20 kHz; or ≥25 kHz.

5. The method of claim 1, comprising down-sampling or time-averaging the recorded data so as to reduce its digitisation frequency between said step of modulating the recorded data and said step of determining the ion mobilities.

6. A method of ion mobility spectrometry comprising:
transmitting a plurality of ions to an ion mobility separator;
modulating the introduction of the ions into the ion mobility separator at a first modulation frequency;
separating the ions that enter the ion mobility separator according to ion mobility;
detecting ions that have exited by the ion mobility separator with a detector of a time of flight mass analyser;
varying the first modulation frequency with time;
recording the intensity of the ion signal output from the detector at an acquisition rate that is greater than the first modulation frequency; and
determining, from the variation in intensity of the ion signal as a function of acquisition time, the ion mobilities of the ions that have been detected.

7. The method of claim 6, wherein the transmission of the ions towards the detector is not modulated downstream of the ion mobility separator and/or is only modulated by said step of modulating the introduction of the ions into the ion mobility separator.

8. The method of claim 6, wherein the step of modulating the introduction of the ions into the ion mobility separator comprises repeatedly alternating between: a first mode in which the ions are transmitted into the ion mobility separator; and a second mode in which substantially all ions are prevented from being transmitted into the ion mobility separator.

9. The method of claim 6, wherein the step of modulating the introduction of the ions into the ion mobility separator comprises:
a) repeatedly alternating between: a first mode in which the ions are transmitted into the ion mobility separator without being attenuated; and a second mode in which ions are attenuated and are then transmitted into the ion mobility separator; or
b) repeatedly alternating between: a first mode in which the ions are attenuated to a first level and then transmitted into the ion mobility separator; and a second mode in which ions are attenuated by an amount greater than the first level and are then transmitted into the ion mobility separator.

10. The method of claim 6, further comprising determining the mass to charge ratios of the ions detected;
associating the ion mobility for any given ion that has been detected with the mass to charge ratio determined for that ion; and
determining the presence of different types of ions in said plurality of ions by determining that the different types of ions have different combinations of ion mobility and mass to charge ratio.

11. The method of claim 6, wherein the ion signal output from the detector is comprised of contributions of different ion signals from different types of ions, wherein the ion signal from each of the different types of ions varies in intensity as a function of the acquisition time or first or second modulation frequency with a pattern, phase or frequency that is characteristic of the ion mobility for that ion, wherein the pattern, phase or frequency that is characteristic of the ion mobility for that ion is used to determine the ion mobility of that ion.

12. The method of claim 6, wherein the intensity of the ion signal output from the detector is determined as a function of acquisition time or the first or second modulation frequency so as to obtain data in an acquisition time or modulation frequency domain; and wherein the method comprises processing said data so as to transform it from said acquisition time or modulation frequency domain into the drift time domain so as to represent the intensity of the ion signal output from the detector as a function of the drift time through the ion mobility separator; and wherein the ion mobilities of the ions are determined from the drift times at which the ion signal peaks.

13. The method of claim 12, wherein the method comprises transforming said data from said acquisition time or modulation frequency domain into the drift time domain so as to represent the intensity of the ion signal output from the detector as a function of the drift time through the ion mobility separator and as a function of mass to charge ratio.

14. The method of claim 13, wherein the ion signal output from the detector is comprised of contributions of different ion signals from different types of ions, and wherein the ion signals contributed by the different types of ions do not overlap with each other when represented in a two dimensional space as function mass to charge ratio and drift time.

15. The method of claim 12, wherein the data is transformed from said acquisition time or modulation frequency domain into the drift time domain by Fourier transformation; or
wherein the data is transformed from said acquisition time or modulation frequency domain into the time domain by a forward modelling deconvolution technique.

16. The method of claim 12, comprising determining a range of drift times or ion mobilities that are associated with one of the different types of ion, filtering the data so as to include only ion signal intensity data and mass to charge ratio data that are associated with drift times or ion mobilities in said range, and identifying the mass to charge ratio of said one of the different types of ion from the filtered data.

17. An ion mobility spectrometer configured to perform the method of claim 6, comprising:
- an ion mobility separator for separating the ions according to ion mobility;
- an ion entrance modulator for modulating the introduction of the ions into the ion mobility separator at the first modulation frequency;
- a time of flight mass analyser having a detector for detecting the ions that have exited by the ion mobility separator;
- a recording device for recording the intensity of the ion signal output from the detector at said acquisition rate that is greater than the first modulation frequency; and
- a controller configured and set up to:
- control the ion entrance modulator so as to vary the first modulation frequency with time; and
- determine, from the variation in intensity of the ion signal as a function of the acquisition time, the ion mobilities of the ions that have been detected.

18. An ion mobility spectrometer comprising:
- an ion mobility separator for separating ions according to ion mobility;
- an ion entrance modulator for modulating the introduction of the ions into the ion mobility separator;
- a time of flight mass analyser having a detector for detecting ions that have exited by the ion mobility separator;
- a recording device for recording the intensity of the ion signal output from the detector to produce recorded data; and
- a controller configured and set up to:
- control the ion entrance modulator so as to modulate the introduction of the ions into the ion mobility separator with a first modulation frequency, wherein first modulation frequency varies with time;
- modulate the recorded data as a function of the time that the data was recorded and at a second modulation frequency, wherein the second modulation frequency is varied as a function of the time that the data was recorded; and
- determine, from the variation in intensity of the ion signal in the modulated data as a function of the second modulation frequency, the ion mobilities of the ions that have been detected:
- wherein said controller is configured and set up to modulate the recorded data by:
- defining the recorded data as having been recorded over a plurality of sequential time periods; and either:
  - (i) retaining the recorded data that was recorded during alternate ones of said time periods, and discarding the data that was recorded during the time periods between said alternate time periods; or
  - (ii) retaining, without attenuation, the recorded data that was recorded during alternate ones of said time periods, and attenuating and retaining the data that was recorded during the time periods between said alternate time periods; or
  - (iii) attenuating to a first level the recorded data that was recorded during alternate ones of said time periods and retaining the attenuated data, and attenuating to a second greater level the recorded data that was recorded during the time periods between said alternate time periods;
  - wherein the time periods differ in duration as a function of the time that the data was recorded such that the second modulation frequency varies as a function of the time that the data was recorded.

* * * * *